Sept. 13, 1932. W. T. BURKHALTER 1,877,384
NUT LOCK
Filed Nov. 18, 1929

INVENTOR:
W. T. Burkhalter.
BY J. T. Newton
ATTORNEYS.

Patented Sept. 13, 1932

1,877,384

UNITED STATES PATENT OFFICE

WILLIAM T. BURKHALTER, OF REIDSVILLE, GEORGIA

NUT-LOCK

Application filed November 18, 1929. Serial No. 408,137.

This invention relates to improvements in nut-locks, and it has for its object the provision of a device in which the nut can be quickly secured on the bolt and also readily released from the same without injury to the parts. The invention consists in the novel construction, combination and arrangement of parts hereinafter described, pointed out in the appended claim and illustrated by the accompanying drawing.

In the accompanying drawing, in which similar reference characters designate corresponding parts, Figure 1 is a perspective view, partly in section and partly broken away, of a rail joint showing an application of the invention.

Figure 1:
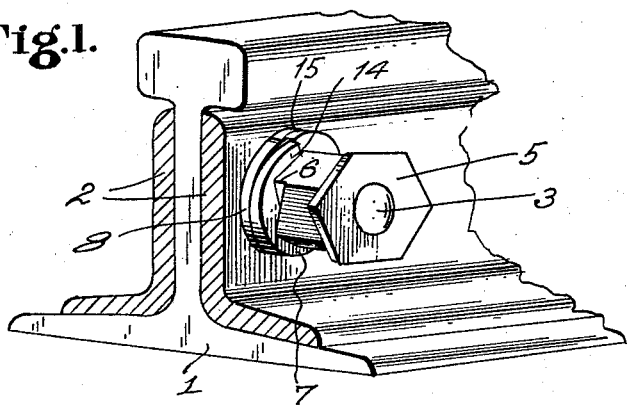
Figure 2:
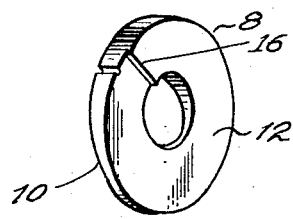
Figs. 2 and 3 are detail perspective views, showing the two washers included in the lock.
Figure 4:
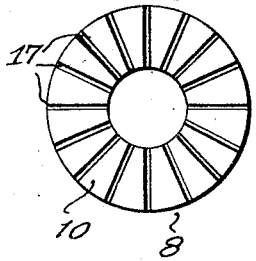
Fig. 4 is a detail view showing the roughened inner face of the washer shown in Fig. 2.
Figure 3:
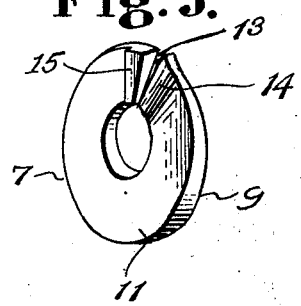
Figure 5:
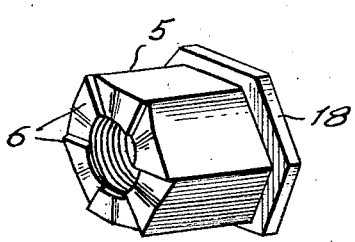
Fig. 5 is a detail perspective view, showing the nut.

Referring to the drawing in detail, 1 designates a railway rail, 2 the fish-plates clamped to opposite sides of the rail, and 3 a bolt extending through the fish-plates and the interposed rail. The bolt has lateral projections 4 adjacent to its head and engaging the adjoining fish-plate to prevent turning of the bolt. These several parts are of the usual construction employed in such devices.

Turned onto the threaded end of the bolt 3 is the nut 5 having ratchet teeth 6 on its inner face. Interposed between the inner end of the nut and the opposite fish-plate are the complementary washers 7 and 8, respectively, carried on the bolt. The face 9 of the washer 7 and the face 10 of the washer 8 are at right-angle to the axis of the respective washers, but the face 11 of the washer 7 and the face 12 of the washer 8 are slightly oblique to the faces 9 and 10, respectively; that is, the faces 11 and 12 are slightly inclined to a plane at right angle to the axis of the washers. In the assembled position of the two washers on the bolt, their inclined faces contact, with the thin part of one washer abutting the thick part of the other washer.

The outer washer 7 is split, as at 13, and one of the ends formed thereby is turned outwardly to form the pawl 14 adapted to engage the ratchet teeth 6 of the nut when the parts are assembled in operative position. This washer is formed of resilient metal so that the pawl normally tends to project beyond the face 9 of the washer. The other end of the split washer is provided with a radial lug 15 on the inner face 11 of the washer. The lug 15, in the assembled relation of the two washers, engages the radial shoulder 16 on the inner face 12 of the washer 8, and this engagement of the lug and shoulder prevents relative turning of the two washers in one direction. The washer 8 is not split and its face 10 is notched or grooved, as 17, so that when this washer is pressed against the adjacent fish-plate, the indented or roughened face of the washer engages the plate and prevents turning of the washer in either direction.

Figure 6:
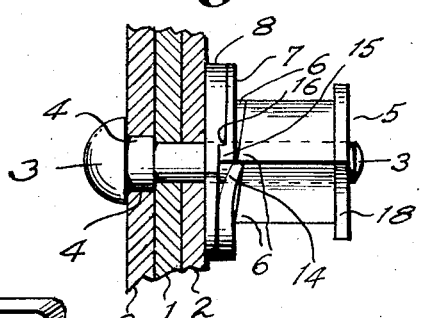
Fig. 6 is a side view of the device, showing in section the rail members connected by the bolt.
Figure 7:
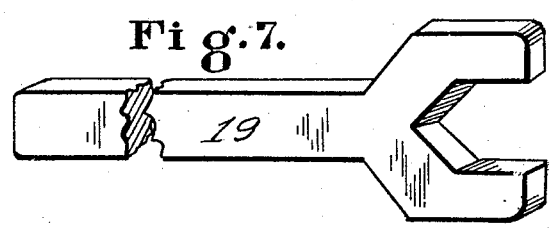
Fig. 7 shows the wrench broken away in part, for turning the nut.

With the several parts assembled in operative position, as shown in Figs. 1 and 6, if the nut is turned to tighten the joint, the ratchet teeth 6 ride over the spring pawl 14 until required tightness of the joint is obtained. When the nut is turned sufficiently to set the parts, the pawl 14 engages one of the ratchet teeth 6 and reverse teeth 6 and reverse movement of the nut with relation to the washer 7 is prevented. When the nut is turned onto the bolt, the friction between the nut and the washer tends to turn the washer with the nut. If the washer 7 is so turned on the bolt, it carries with it the washer 8 through the engagement of the lug 15 with the shoulder 16, so that the proper relative positions of the two washers is maintained during the setting of the nut. The tightening of the nut on the bolt forces the inner or base washer 8 against the adjacent fish-plate and the friction between the latter and the roughened inner face of the washer prevents turning of this washer. As the turning of the washer 8 is prevented by its frictional engagement with the fish-plate, the engagement of the lug 15 with the shoulder 16 will also prevent turning of the washer 7 during the last part of the turning movement of the nut as the latter is finally set. By preventing the turning movement of the washers during the final turning of the nut, the latter can be crowded to a position in which the pawl 14 springs into snug engagement with one of the ratchet teeth 6 and the nut is thereby firmly held in place.

Loosening of the nut on the bolt, after it has been set thereon, is prevented by the engagement of one of the ratchet teeth 6 of the nut with the pawl 14 of the washer 7, which is prevented from turning. The inner or base washer 8 is prevented from turning by its frictional engagement with the adjacent fish-plate. In the normal relative positions of the two washers, the thin edge of one is opposite to the thick edge of the other, so that any relative turning of the two would effect a camming or wedging action between the fish-plate and nut to lock the latter on the bolt. In a reverse or unscrewing turning of the nut on the bolt, one of the ratchet teeth 6 engaging the pawl 14 would turn the washer 7 with the nut. During this turning movement of the washer 7 the washer 8 would be held stationary so that a relative rotation of the two would result. As the pitch of the inclined contacting faces of the two washers is considerably greater than the pitch of the thread of the bolt, a very slight relative turning of the two washers would result in a wedging action that would jam the nut so that it could not unscrew any further.

Means are provided whereby the nut can be readily released from the bolt. On the outer end of the nut is a peripheral flange 18. A wrench 19 is provided to fit the nut so that when it is thrust onto the same beneath the flange, it will bear on the pawl 14 and disengage the latter from the ratchet teeth 6, thereby freeing the nut so that it can be unscrewed. As shown in the drawings, the nut is of a hexagonal shape to provide opposite parallel sides to accommodate the wrench, but the nut can also be square to effect the same purpose.

What I claim is:

In a nut-lock, the combination of a bolt and a nut threaded thereon provided with ratchet teeth on its inner face, with contacting washers of the same diameter on the bolt between the nut and the object through which the bolt passes and with the inner washer provided with means for frictional engagement with the abutting face of the object, said washers having flat contacting faces oblique to the axis of the washers and their outer faces at right-angles to said axis and with the inclination of the contacting faces at a greater pitch than that of the engaged threads of the bolt and nut, said washers being arranged in normal contact relation with the thin edge of one washer opposite to the thick edge of the other washer, the inner of said washers having a radial shoulder on its inner face at the thicker part of the washer, the outer of said washers being radially cut across at its thinner part to provide separated end parts, one of said end parts being bent outwardly to form a pawl to engage the ratchet teeth of the nut on backward turning of the nut, the backward turning of the nut operating to rotate the engaged washer relatively to the other washer so that the contacting faces siding on each other at a greater pitch than that of the engaged threads of the bolt and nut effect a wedging thrust of the washers between the object and the nut to prevent loosening of the latter, and a radial lug on the other end part of the outer washer operating to engage the radial shoulder on the inner washer to maintain the two washers in their normal relation should the outer washer be turned by the forward turning of the nut on the bolt.

In testimony whereof I affix my signature.

WILLIAM T. BURKHALTER.